United States Patent
Kim et al.

(10) Patent No.: US 8,777,300 B2
(45) Date of Patent: Jul. 15, 2014

(54) SHOCK ABSORBER HOUSING SUPPORTING APPARATUS FOR VEHICLE

(71) Applicants: Hyundai Motor Company, Seoul (KR); Kia Motors Corporation, Seoul (KR)

(72) Inventors: Kyeong Jae Kim, Hwaseong-si (KR); Yun Chang Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/711,560

(22) Filed: Dec. 11, 2012

(65) Prior Publication Data

US 2014/0049072 A1 Feb. 20, 2014

(30) Foreign Application Priority Data

Aug. 14, 2012 (KR) .................. 10-2012-0089132

(51) Int. Cl.
*B62D 25/08* (2006.01)
*B62D 25/16* (2006.01)

(52) U.S. Cl.
USPC .................. 296/203.02; 296/198; 296/192

(58) Field of Classification Search
USPC .......... 296/203.01–203.02, 193.09, 198, 192
See application file for complete search history.

(56) References Cited

U.S. PATENT DOCUMENTS 8,240,747 B2 * 8/2012 Kim .............................. 296/192

FOREIGN PATENT DOCUMENTS

| JP | 2-113580 U | | 9/1990 |
| JP | 4-2579 | * | 1/1992 |
| JP | 05-238420 A | | 9/1993 |
| JP | 6-255532 | * | 9/1994 |
| JP | 2003-246280 A | | 9/2003 |
| JP | 2004-276698 A | | 10/2004 |
| KR | 10-2004-0042176 A | | 5/2004 |
| KR | 10-2012-0000920 A | | 1/2012 |

* cited by examiner

*Primary Examiner* — Dennis H Pedder
(74) *Attorney, Agent, or Firm* — Morgan, Lewis & Bockius LLP

(57) ABSTRACT

A shock absorber housing supporting apparatus for a vehicle installed in a front body including a shock absorber housing disposed between a fender apron upper member provided in an upper portion of a fender apron and a front side member provided in a length direction of a vehicle body and having a beam shape, and a cowl connected to a front side of a front glass and having a panel shape, may include a first supporting device connecting the front side member and the fender apron upper member and covering the shock absorber housing in between them, and a second supporting device connecting the front side member and the cowl and covering the shock absorber housing in therebetween.

9 Claims, 4 Drawing Sheets

SHOCK ABSORBER HOUSING SUPPORTING APPARATUS FOR VEHICLE

CROSS-REFERENCE TO RELATED APPLICATION

The present application claims priority to Korean Patent Application No. 10-2012-0089132 filed on Aug. 14, 2012, the entire contents of which is incorporated herein for all purposes by this reference.

BACKGROUND OF THE INVENTION

1. Field of the Invention

The present invention relates a shock absorber housing supporting apparatus for a vehicle and, more particularly, to a shock absorber housing supporting apparatus for a vehicle capable of enhancing shock-absorbing performance in the occurrence of a vehicle collision.

2. Description of Related Art

In general, shock-absorbing performance refers to performance for alleviating shock power (or impact force) when two objects collide.

Recently, stability of a vehicle, among vehicle performance, has come to prominence. Vehicle stability includes shock-absorbing performance in case of a vehicle collision. Also, shock-absorbing performance greatly weighs in vehicle merchantable quality. Of course, in order to alleviate a shock transmission to a passenger in the occurrence of a vehicle collision, various devices such as an air bag, a seat belt and the like, are used. However, prior to performance of the safety devices, shock-absorbing performance of a vehicle body should be enhanced.

A shock absorber is a device for stabilizing a vehicle body against an external shock or impact. Also, a shock absorber makes a spring smoothly operate in canceling out shock applied thereto or alleviate vibrations of the spring. Meanwhile, a shock absorber housing is a housing in which a shock absorber is installed.

A front body of a vehicle is where an engine or front wheel suspension, a radiator, and a steering gear box, and the like are installed, requiring rigidity (or stiffness). Also, in case of a front engine front wheel driving (FF) vehicle, since an engine room is installed in the front body, rigidity of the front body is of high importance. Thus, the front body should be designed to alleviate shock power and protect a passenger in a vehicle in the occurrence of a vehicle collision.

A front side member, a member forming a frame of the front body, is installed in both sides of a lower front portion of a front floor constituting a bottom of a front portion of a compartment and a dash board partitioning the front body and the interior of the compartment. The front side member has a structure for mainly blocking (or absorbing) a shock applied to the suspension. Also, the front side member serves to support a front bumper.

The shock absorber housing is installed on the front side member. Also, the shock absorber housing is coupled to upper portions of the front side member and a fender apron through spot welding.

The fender apron refers to a portion positioned at an inner side of a fender and partitioning a wheel and an engine room. Also, the fender apron supports force transmitted from the suspension and protects various components.

As described above, the shock absorber is mounted in the shock absorber housing and the suspension is supported in a peripheral region, so the shock absorber housing requires high rigidity relative to other portions of the vehicle body.

Namely, when rigidity of the shock absorber housing is degraded, rigidity of the front body is degraded to result in making bad influence on the shock absorbing performance in the occurrence of a vehicle collision.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a shock absorber housing supporting apparatus for a vehicle having advantages of enhancing shock-absorbing performance in the occurrence of a vehicle collision.

The present invention has also been made in an effort to provide a shock absorber housing supporting apparatus for a vehicle having advantages of enhancing general rigidity of a vehicle.

In an aspect of the present invention, a shock absorber housing supporting apparatus for a vehicle installed in a front body including a shock absorber housing disposed between a fender apron upper member provided in an upper portion of a fender apron and a front side member provided in a length direction of a vehicle body and having a beam shape, and a cowl having a panel shape, may include a first supporting device connecting the front side member and the fender apron upper member and covering the shock absorber housing therebetween; and a second supporting device connecting the front side member and the cowl and covering the shock absorber housing therebetween.

A section of the first supporting device and a section of the second supporting device have a U-shape, and the sections having the U-shape in the first supporting device and the second supporting device are installed on the shock absorber housing.

A portion of the shock absorber housing in which the first supporting device is installed is bent inwardly of the shock absorber housing so a section of the shock absorber housing has a U-shape corresponding to the sections of the first supporting device and the second supporting device.

The first and second supporting devices having the U-shaped section and a lateral surface of the shock absorber housing form a box beam shape.

The shock absorber housing includes a shock absorber cover covering an upper surface of the shock absorber housing, wherein the first supporting device is bent at a boundary portion between the shock absorber housing and the shock absorber cover.

In another aspect of the present invention, a shock absorber housing supporting apparatus for a vehicle installed in a front body including a shock absorber housing disposed between a fender apron upper member provided in an upper portion of a fender apron and a front side member, a shock absorber cover covering an upper surface of the shock absorber housing, and an engine mounting bracket fixed to the front side member at a front side of the shock absorber housing, may include a supporting device provided to be bent at a boundary portion between the shock absorber housing and the shock absorber cover and installed on a lateral surface of the shock absorber cover housing and the shock absorber cover, wherein one end of the supporting device is connected to the front side member and the other end of the supporting device is connected to the fender apron upper member.

A section of the supporting device has a U-shape, and the section having the U-shape is installed on the shock absorber housing.

The lateral surface of the shock absorber housing on which the supporting device is installed is depressed inwardly of the shock absorber housing.

The supporting device includes: a first supporting device connecting the front side member and the fender apron upper member and covering the shock absorber housing therebetween; and a second supporting device connecting the front side member and the cowl and covering the shock absorber housing therebetween.

The lateral surface of the shock absorber housing is formed to implement a box beam shape with the supporting device.

In further another aspect of the present invention, a shock absorber housing supporting apparatus for a vehicle installed in a front body including a shock absorber housing disposed between a cowl having a panel shape and a front side member provided in a length direction of a vehicle body and having a beam shape, may include a supporting device extending from one end thereof connected to the cowl along a lateral surface of the shock absorber housing and having the other end connected to the front side member.

A section of the supporting device has a U-shape, and the section having the U-shape is installed in the shock absorber housing.

The lateral surface of the shock absorber housing and the supporting device form a box beam shape.

The supporting device includes: a first supporting device connecting the front side member and the fender apron upper member and covering the shock absorber housing therebetween; and a second supporting device connecting the front side member and the cowl and covering the shock absorber housing therebetween.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
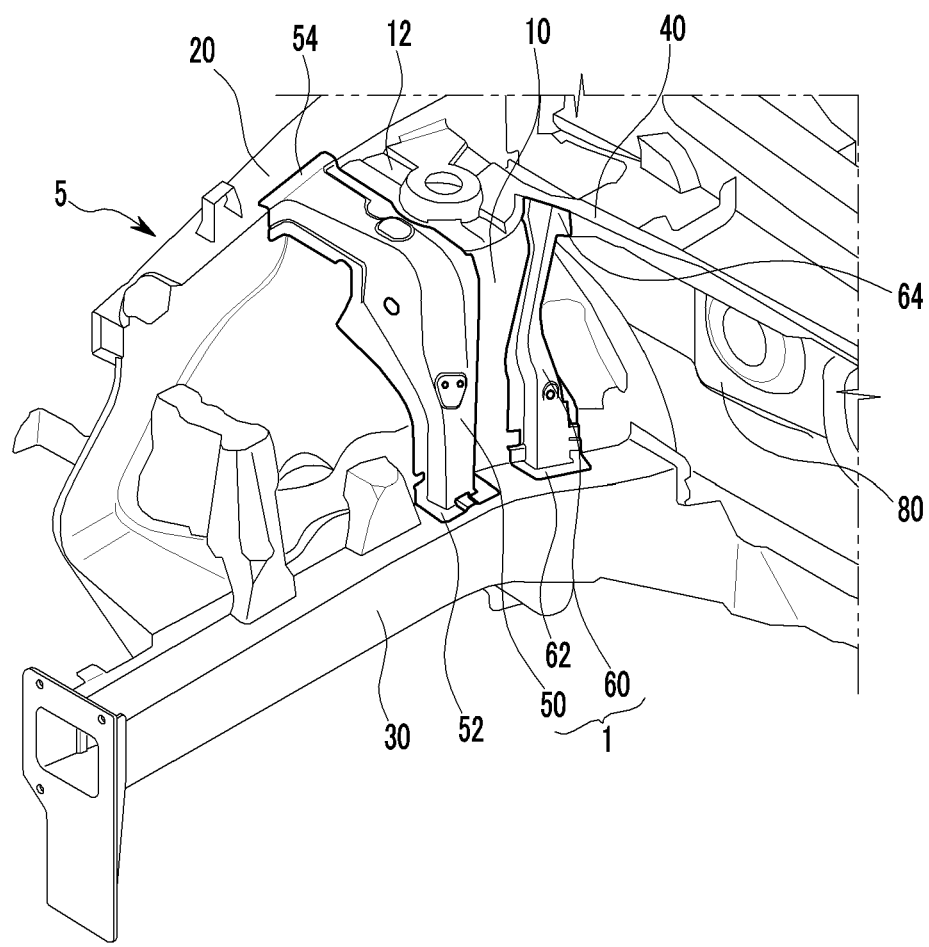
FIG. 1 is a perspective view of a shock absorber housing supporting apparatus for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a perspective view of a shock absorber housing supporting apparatus for a vehicle according to an exemplary embodiment of the present invention. FIG. 1 shows a shock absorber housing supporting apparatus 1 for a vehicle installed in a front body.

As illustrated in FIG. 1, the front body in which the shock absorber housing supporting apparatus 1 for a vehicle is installed includes a fender apron upper member 20, a front side member 30, a cowl 40, and a shock absorber housing 10. Also, the shock absorber housing supporting apparatus 1 for a vehicle includes a first support device 50 and a second support device 60.

The fender apron upper member 20 is provided in an upper portion of a fender apron 5 serving as a partition between a wheel and an engine room at an inner side of the fender.

Te front side member 30 is provided in a lower portion of a front floor and the dash board 80 in a vertical direction of a vehicle body as a length direction thereof, which is a beam forming a frame of the front body.

The cowl 40 is a panel connected to a front side of a front glass of the vehicle. Also, the cowl 40 may extend from the dash board 80 or installed in the dash board 80.

The shock absorber housing 10 is disposed between the fender apron upper member 20 and the front side member 30. Also, the shock absorber housing 10 is coupled to the fender apron upper member 20 and the front side member 30 through welding. In addition, a shock absorber cover 12 covers an upper surface of the shock absorber housing 10

The first supporting device 50 is installed on a front surface of the shock absorber housing 10.

The second supporting device 60 is installed relatively in the rear of the shock absorber housing 10, in comparison to the first supporting device 50.

Figure 2:
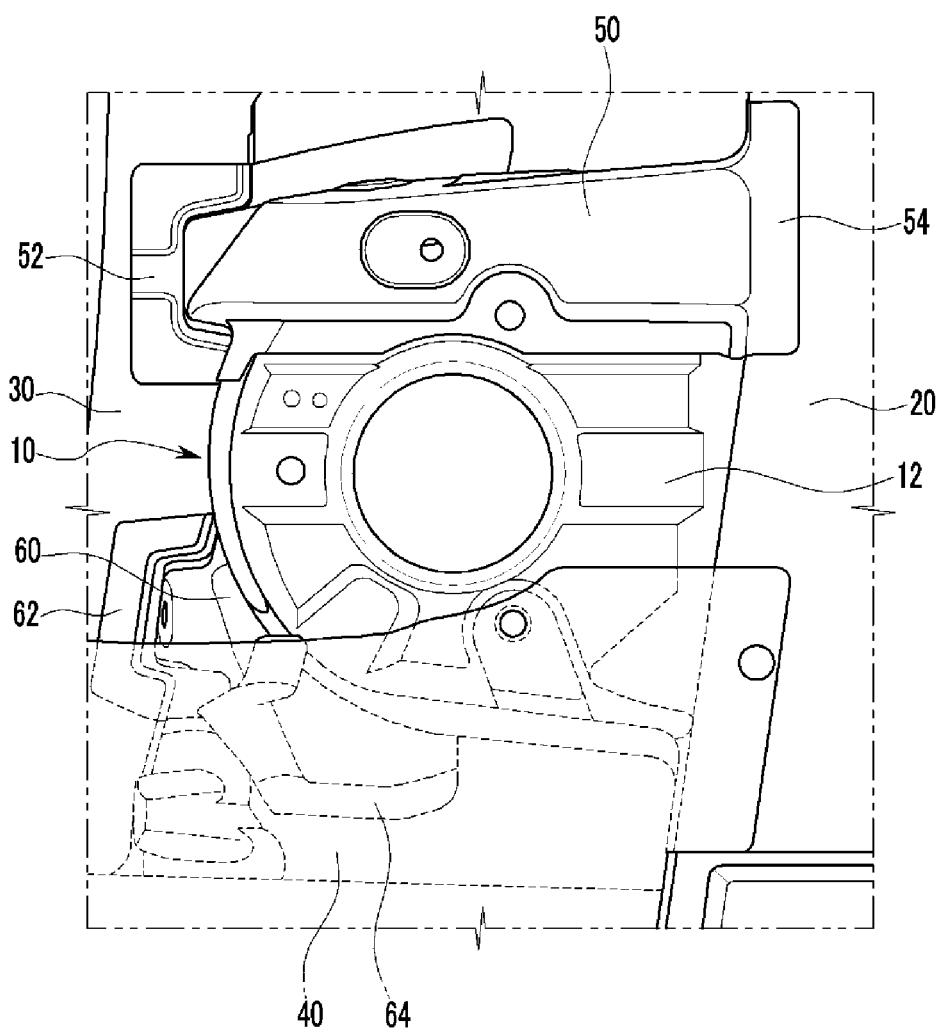
FIG. 2 is a plan view of the shock absorber housing supporting apparatus for a vehicle according to an exemplary embodiment of the present invention.

FIG. 2 is a plan view of the shock absorber housing supporting apparatus for a vehicle according to an exemplary embodiment of the present invention.

As illustrated in FIGS. 1 and 2, the first supporting device 50 includes a first connection portion 52 and a second connection portion 54, and the second supporting device 60 includes a third connection portion 62 and a fourth connection portion 64.

The first connection portion 52 is connected to the front side member 30, and the second connection portion 54 is connected to the fender apron upper member 20. Also, the first supporting device 50 cover a front surface of the shock absorber housing 10 between the first connection portion 52 and the second connection portion 54.

In detail, the first supporting device 50 extends from the front side member 30 connected to the first connection portion 52 to the vicinity of the shock absorber cover 12 along a lateral surface in front of the shock absorber housing 10, and bent to extend along the shock absorber cover 12 in the vicinity of the shock absorber cover 12. Also, the first supporting device 50 extends up to the fender apron upper member 20 connected to the second connection portion 54 along the shock absorber cover 12. Namely, the first supporting device 50, covering the shock absorber housing 10, supports the front side member 30 and the fender apron upper member 20. Thus, the rigidity of the vehicle body can be increased, and shock-absorbing performance can be enhanced.

The third connection portion 62 is connected to the front side member 30, and the fourth connection portion 64 is connected to the cowl 40. Also, the second supporting device 60 covers a portion of the rear surface of the shock absorber housing 10 between the third connection portion 62 and the fourth connection portion 64.

In detail, the second supporting device 60 extends from the front side member 30 connected to the third connection portion 62 to the cowl 40 connected to the fourth connection portion 64 along the lateral surface of the rear side of the shock absorber housing 10. Namely, the second supporting device 60, covering the shock absorber housing 10, supports the front side member 30 and the cowl 40. Thus, the rigidity of the vehicle body can be increased and shock-absorbing performance can be enhanced.

Meanwhile, the first supporting device 50 and the second supporting device 60 have a U-shape in sections and are installed in the shock absorber housing 10 in the direction of the U-shaped open configuration, forming a box beam structure with four sides closed.

The box beam structure having a higher level of rigidity than that of a panel structure is obvious to a person skilled in the art, so a detailed description thereof will be omitted.

Figure 3:
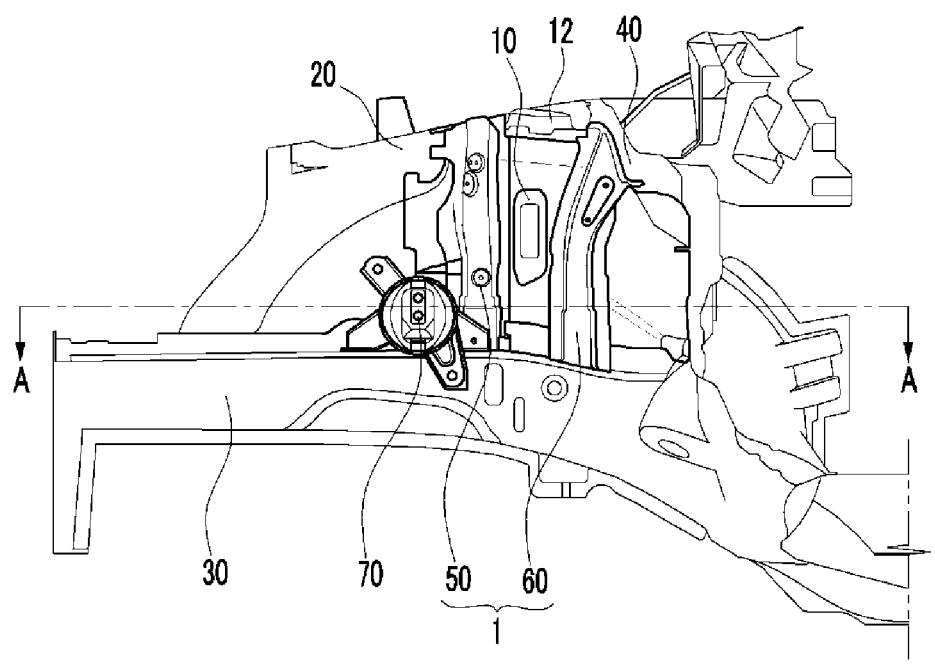
FIG. 3 is a perspective view of a shock absorber housing supporting apparatus for a vehicle according to another embodiment of the present invention.

FIG. 3 is a perspective view of a shock absorber housing supporting apparatus for a vehicle according to another embodiment of the present invention.

As illustrated in FIG. 3, a front body in which the shock absorber housing supporting apparatus 1 for a vehicle is installed according to another embodiment of the present invention includes an engine mounting bracket 70.

The engine mounting bracket 70 is a component supportedly fixing the engine to the vehicle body. Meanwhile, an engine room is disposed in the front body of a front engine front wheel driving vehicle. Thus, an engine mounting for mounting the engine in the vehicle body is provided in the front body of the front engine front wheel driving vehicle. Also, the engine mounting bracket 70 serves to fix the engine mounting (not shown) to the vehicle body. The engine mounting and the engine mounting bracket 70 are obvious to a person skilled in the art, so a detailed description thereof will be omitted.

The engine mounting bracket 70 may be fixedly welded to the front side member 30 at a front side of the shock absorber housing 10. In this case, installation of the first supporting device 50 may be interfered with by the engine mounting bracket 70. Namely, an installation space of the first supporting device 50 may be reduced.

Figure 4:
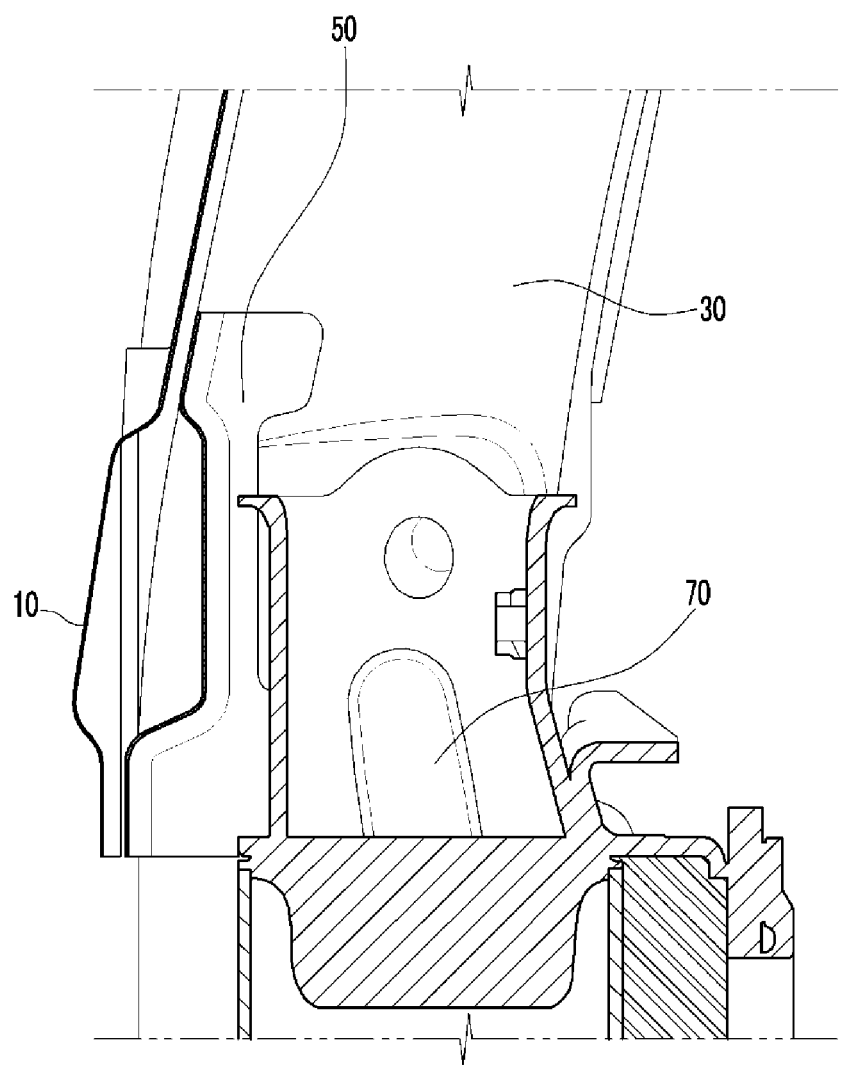
FIG. 4 is a cross-sectional view taken along line A-A in FIG. 3.

FIG. 4 is a cross-sectional view taken along line A-A in FIG. 3.

As illustrated in FIG. 4, when the installation space of the first supporting device 50 is reduced, the section of the first supporting device 50 may not have a U-shape. Also, even though the section of the first supporting device 50 has a U-shape, an internal space of the U-shape may be excessively small. Meanwhile, when the U-shaped internal space is excessively small, a box beam structure having a high level of rigidity cannot be implemented although the U-shaped open configuration is installed in the shock absorber housing 10. Namely, rigidity of the first supporting device 50 may be degraded together with the panel structure.

Thus, in the present embodiment in which the front body includes the engine mounting bracket 70, the section of the shock absorber housing 10 in which the first supporting device 50 is installed may be changed to have the shape as illustrated in FIG. 4. Namely, the section of the shock absorber housing 10 may be bent inwardly of the shock absorber housing 10 to have a U-shape corresponding to the shape of the section of the first supporting device 50. In this manner, since the lateral surface of the shock absorber housing 10 in which the first supporting device 50 is installed is depressed inwardly, the lateral surface of the shock absorber housing 10 may implement a box beam structure with four sides closed together with the first supporting device 50. Thus, even in the front body including the engine mounting bracket 70, rigidity of the first supporting device 50 can be maintained.

As described above, according to embodiments of the present invention, since two supporting devices 50 and 60 are installed, rigidity of the shock absorber housing 10 can be increased. Also, since the first and second supporting devices 50 and 60 are connected to the fender apron upper member 20, the front side member 30, and the cowl 40, rigidity of the vehicle body can be increased and shock-absorbing performance can be enhanced. In addition, even in the front body including the engine mounting bracket 70, rigidity of the first supporting device 50 can be maintained by changing the shape of the section of the shock absorber housing 10.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shock absorber housing supporting apparatus for a vehicle installed in a front body including a shock absorber housing disposed between a fender apron upper member provided in an upper portion of a fender apron and a front side member provided in a length direction of a vehicle body and having a beam shape, and a cowl having a panel shape, the apparatus comprising:
    a first supporting device connecting the front side member and the fender apron upper member and covering the shock absorber housing and a shock absorber cover therebetween, and
    a second supporting device connecting the front side member and the cowl and covering the shock absorber housing therebetween.

2. The shock absorber housing supporting apparatus of claim 1, wherein a section of the first supporting device and a section of the second supporting device have a U-shape, and the sections having the U-shape in the first supporting device and the second supporting device are installed on the shock absorber housing.

3. The shock absorber housing supporting apparatus of claim 2, wherein a portion of the shock absorber housing in which the first supporting device is installed is bent inwardly of the shock absorber housing so a section of the shock absorber housing has a U-shape corresponding to the sections of the first supporting device and the second supporting device.

4. The shock absorber housing supporting apparatus of claim 2, wherein the first and second supporting devices having the U-shaped section and a lateral surface of the shock absorber housing form a box beam shape.

5. The shock absorber housing supporting apparatus of claim 1, wherein the first supporting device is bent at a boundary portion between the shock absorber housing and the shock absorber cover.

6. A shock absorber housing supporting apparatus for a vehicle installed in a front body including a shock absorber housing disposed between a cowl having a paenl shape and a front side member provided in a length in a direction of a vehicle body and having a beam shape, the apparatus comprising:

a first supporting device connecting the front side member and the fender apron upper member and covering the shock absorber housing and a shock absorber cover therebetween, and a second supporting device extending from one end thereof connected to the cowl along a lateral surface of the shock absorber housing and having the other end connected to the front side member.

7. The shock absorber housing supporting apparatus of claim 6, wherein a section of the supporting device has a U-shape, and the section having the U-shape is installed on the shock absorber housing.

8. The shock absorber housing supporting apparatus of claim 6, wherein the lateral surface of the shock absorber housing and the supporting device form a box beam shape.

9. The shock absorber housing supporting apparatus of claim 6, wherein the second supporting device connecting the front side member and the cowl and covering the shock absorber housing therebetween.

\* \* \* \* \*